Feb. 5, 1924.
F. H. VAN HOUTEN
SPACING RECTIFIER
Filed Nov. 15, 1922
1,482,667
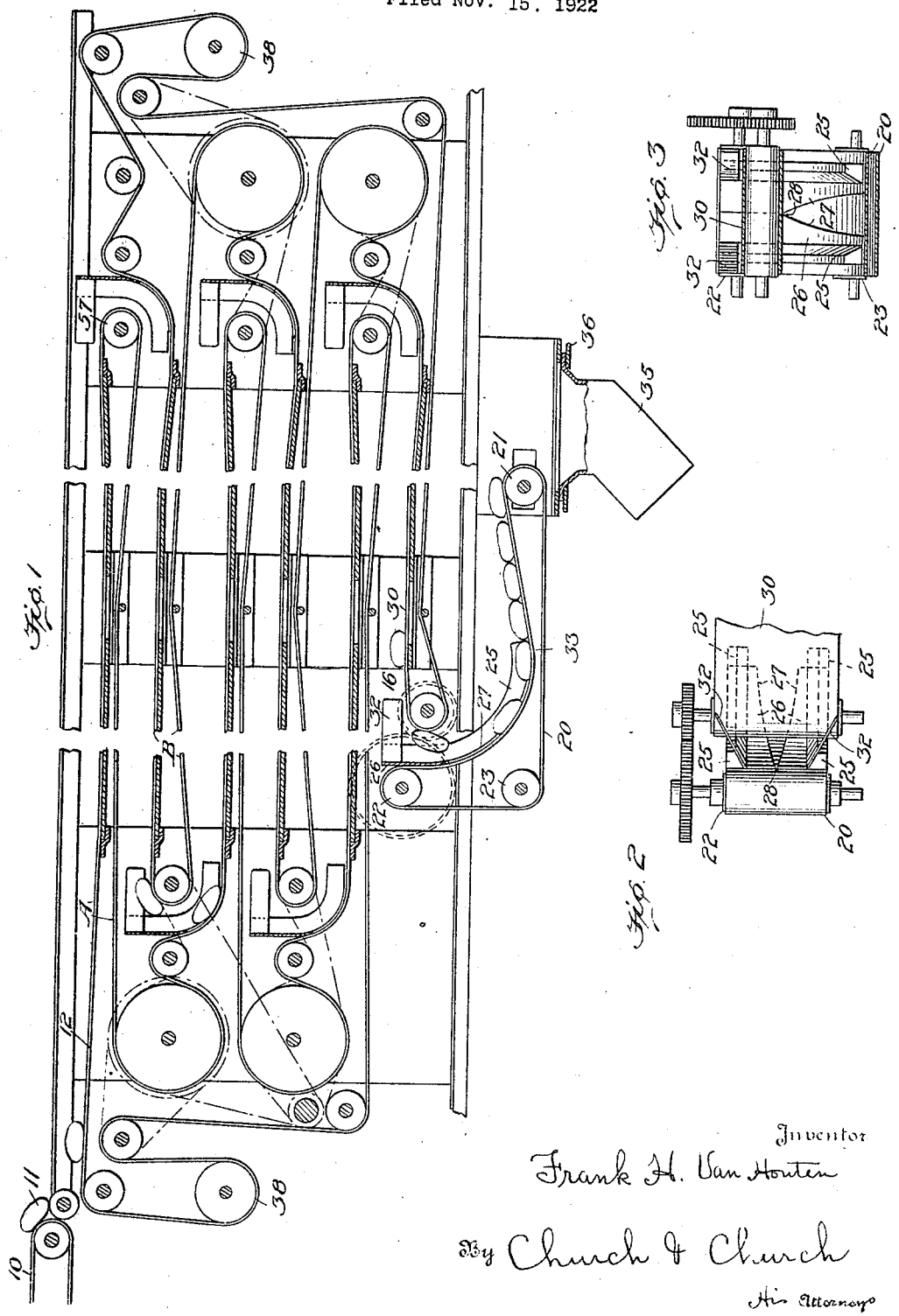
Inventor
Frank H. Van Houten
By Church & Church
His Attorneys Patented Feb. 5, 1924.

1,482,667

UNITED STATES PATENT OFFICE.

FRANK H. VAN HOUTEN, OF BEACON, NEW YORK, ASSIGNOR TO DUTCHESS TOOL COMPANY, OF BEACON, NEW YORK, A CORPORATION OF NEW YORK.

SPACING RECTIFIER.

Application filed November 15, 1922. Serial No. 601,099.

*To all whom it may concern:*

Be it known that I, FRANK H. VAN HOUTEN, a citizen of the United States, residing at Beacon, in the county of Dutchess and State of New York, have invented certain new and useful Improvements in Spacing Rectifiers; and I do hereby declare the following to be a full, clear, and exact description of the same, reference being had to the accompanying drawings forming part of this specification.

This invention relates to a device primarily intended for use in handling plastic and non-rectangular articles, particularly balls of dough, in such a way as to rectify the spacing apart of the articles after such spacing has been disarranged from any cause.

The object of the present invention is to provide a spacing rectifier for use between a dough proofing cabinet and a molding machine or in any similar combination, such rectifier being characterized by the provision of means for preventing the rolling of the objects to such a degree as to cause them to pile in a manner to destroy the accurate spacing necessary for certain purposes.

A further object of the present invention is the provision of a dough proofing cabinet having at each discharge a device for controlling the tendency of the dough balls to roll or rotate as they leave the discharge end of the various conveying conveniences.

The invention is described in a specific embodiment and while this is the principal use of the invention it must be remembered that the specific embodiment is illustrated only.

In handling dough it is quite essential to the best results that the balls of dough shall be delivered to the molder at a uniform rate. Every effort is made to preserve uniform spacing of the dough through the various devices it must pass in the baking operation, but in spite of the best endeavors the accurate spacing becomes disarranged at times and it is not at all uncommon to find several pieces of dough close together followed or preceded by a considerable vacant space of belt, such an occurrence in the proofer for example resulting in the pieces so bunched dropping or following one another so closely that two or more are carried into the molder simultaneously.

By the use of a spacing rectifier such as shown in the drawings it is possible to correct the spacing of the balls of dough and to deliver them at a practically uniform rate to the molder, the rectifier overcoming the effect of momentum or inertia of the balls as they are discharged from the proofer belt by presenting to such balls a substantially normal surface moving at a lower rate of speed than the proofer belt and in such direction as to agree with the direction of the rotation of the balls so as to gradually slow them up and yet bring them to a quiet position on the rectifying belt in a minimum of time.

In the drawings—

Figure 1 is a side elevation of a proofing cabinet embodying the invention, the view being partly in section.

Fig. 2 is a top plan view of the receiving end of the spacing rectifier belt.

Fig. 3 is an elevation of the parts shown in Fig. 2.

10 is a belt delivering balls of dough 11 to the top reach 12 of a dough proofing cabinet of the usual Dutchess type having two belts A and B forming alternate conveying reaches discharging at the point 16, belts A and B being driven at uniform speed. The spacing rectifying belt 20 is mounted on the roll 21 and 22 the latter being the driving roll, the belt also passing over the idle roll 23 adjustably mounted as customary in the art.

The three rolls 21, 22 and 23 are so located as to permit the belt to be indented to form an arcuate incline of substantially 90°, that is, the fourth part of a cylinder. This indenting of the belt is arranged by providing a pair of guides 25 secured to the side plates which carry the shaft bearings and fastening under these two guides a thin sheet metal plate 25 (which may be formed in two parts if desired) and under which the belt 20 is forced to travel being exposed in part under the sheet metal plate or guide 26 by the formation of a notch 27 in the plate having its apex 28 somewhat below the conveying reach 30 of the belt B.

This belt B travels at a considerably greater rate of speed than the belt 20; a convenient speed found in practice for belt B being 60 feet per minute with the pieces of dough spaced twelve inches center to center and for the belt 20 the preferable speed is one-half of that of the belts A and B namely, 30 feet per minute.

The vanes 32 are secured to the beveled sides of the guides 25 to insure against an incorrectly positioned lump of dough being thrown to one side of the belt 20 which, as will be seen from the drawings, is somewhat narrower in width than the proofer belts.

By reason of the provision of the notch 27 in the sheet metal slide the balls of dough are prevented from coming to rest in their travel down the circular incline as these balls will be in contact with the belts 20 at some portion and will therefore be carried down the incline should they fail to slide.

The belt 20 from the lower portion 33 of the arcuate incline rises to the top of the roller 21, this incline of the belt neutralizing any tendency of the ball to rotate in a direction opposite to that of the movement of the belt. The balls are discharged from the roller 21 into a depending chute 35 mounted on an annular support 36 so that the chute may be turned at any angle to deliver the balls of dough in the direction desired.

As will be noted from Fig. 1 arcuate inclines are provided in belts A and B adjacent each discharge point of the opposite belt, these inclines being formed in a manner exactly similar to that described in connection with belt 20, save that idle rollers such as 23 are rendered unnecessary since the roll 57 similar to the rolls 22 are each positively driven and the slack of the belt is taken up by the customary gravity rolls 38. The principal difference between the operation in the arcuate inclines of the belts A and B and of the belt 20 which delivers to the molder being that in the proofer proper the delivering and the receiving portions of the belts are always moving at the same rate of speed, whereas, in the bottom belt the speed of the receiving belt is but half of that of the delivering or proofer belt, and that in the proofer the balls of dough do not slide into contact with one another.

The operation of the device is as follows: Dough is delivered to the proofer and is conveyed over the various reaches for the appropriate time finally landing upon one of the proofer belts at the point 16 ready to be delivered to the molder in the old practice or to the spacing rectifier in the present practice. Since the proofer belt is moving at a fairly rapid rate of speed the balls of dough as they are discharged tend to rotate in a counter-clockwise direction as viewed in Fig. 1. If these balls were delivered directly to a parallel belt this rotation of the balls woud pile the dough and destroy the spacing since some of the balls would rotate and others would not. By the provision of the circular incline together with the sheet metal plate all tendency to roll out of position is destroyed, the balls of dough touching quite regularly on the upward incline 39 and the balls of dough sliding from the point of discharge on the proofer belt down the arcuate incline and into contact with the balls of dough on the upward incline 39 and since this belt 20 moves at a constant speed the balls of dough will be delivered at the discharge point adjacent the roll 21 at a perfectly constant speed, inaccuracies of spacing all having been taken up in the slide down the circular incline.

What I claim is:

1. In combination, a conveying reach, an endless belt partly underlying said reach and positioned to receive articles from said reach, and a curved smooth surface lying in the path of said articles as they are discharged from the reach to the belt, the linear speed of the reach being greater than the linear speed of the belt, and said curved surface being concave to said conveying reach.

2. In combination, a conveying reach, an endless belt partly underlying said reach and positioned to receive articles from said reach, and a curved smooth surface lying in the path of said articles as they are discharged from the reach to the belt, the receiving belt having an upwardly inclined portion just beyond said smooth surface.

3. In combination, a conveying reach, an endless belt partly underlying said reach and positioned to receive articles from said reach, and a curved smooth surface lying in the path of said articles as they are discharged from the reach to the belt, the linear speed of the reach being greater than the linear speed of the belt, said curved surface being concave to said conveying reach, and the receiving belt having an upwardly inclined portion just beyond said smooth surface.

4. The combination with an endless belt for rectifying the spacing of dough balls consisting of a downwardly directed curved portion lying in the path of said balls, an upwardly inclined portion extending from the bottom of the curved portion to a point of discharge, and a portion extending from the discharge point to the top of the curved portion of a guide for forming the curved portion of the belt and a plurality of rolls for directing the other portions of the belt.

5. The combination with an endless belt for rectifying the spacing of dough balls consisting of a downwardly directed curved portion lying in the path of said balls, an upwardly inclined portion extending from the bottom of the curved portion to a point of discharge, and a portion extending from the discharge point to the top of the curved portion, said curved portion being substantially the fourth part of a cylinder of a guide for forming the curved portion of the belt and three rolls for guiding the remaining portions of the belt.

6. In a spacing rectifier for dough balls, a conveying reach, a discharge belt having its discharging surface upwardly inclined toward the point of discharge, and a slide downwardly inclined from said reach to the discharge belt, said discharge belt moving at a lower speed than said conveying reach.

7. An intermediate member for a two belt dough ball conveyor consisting of a guide for the second belt so positioned as to lie in the path of the balls as they pass from the first to the second belt.

8. The device of claim 7 characterized by the provision of a forwardly diverging notch in the intermediate member having its vertex below the plane of the conveying reach of the first belt.

9. The device of claim 7 in which the intermediate member has a curved surface substantially vertical at its top and substantially horizontal at its bottom.

10. A belt guide consisting of a sheet metal member bent to form substantially the fourth part of a cylinder, and having a V-shaped notch diverging towards the lower substantially horizontal end of said guide.

11. The combination of a dough ball conveying reach and a discharge belt positioned to receive the balls as they fall from said conveying reach characterized by the provision of guiding means for directing a portion of said discharge belt so as to engage said balls in the direction of the rotation of said balls as they fall by gravity from the conveying reach.

12. In a conveyor, a belt having a substantially horizontal reach, a second belt adapted to receive articles from the first belt, and means for guiding a portion of said second belt to present a surface substantially normal to said horizontal reach.

13. In a device for preventing the piling up of dough balls delivered at uneven periods from a conveying reach and for discharging same at regular periods to a dough handling machine; an endless belt presenting a curved surface to the balls as they drop from the conveying reach, said surface being concave to said conveying reach adjacent to the point of delivery, means lying in the path of said balls for forming said curved surface, said belt moving slower than said conveying reach and moving at said curved portion in a direction to engage the balls in the direction of their rotation as they fall from the conveying reach.

14. In a spacing rectifier, a plurality of rollers, a driving roller, an endless belt over said rollers, and an outwardly concave guide located between two of said rollers to indent said belt between said rollers, a conveying reach moving at a higher rate of speed than said belt and discharging articles by gravity to the indented portion of said belt, said belt having a discharge portion inclined upwardly from the bottom of said indented portion to the point of discharge, the space between said reach and said belt being such that the articles may slide down said indented portion into contact with one another at the bottom of said portion so as to be discharged at regular intervals from said belt.

FRANK H. VAN HOUTEN.